United States Patent [19]

Koshiba et al.

[11] Patent Number: 4,874,680
[45] Date of Patent: Oct. 17, 1989

[54] LITHIUM SECONDARY BATTERY

[75] Inventors: Nobuharu Koshiba, Nara; Toshihiko Ikehata, Katano; Kenichi Takata, Hirakata, all of Japan

[73] Assignee: Matsushita Electric Industrial Co., Ltd., Osaka, Japan

[21] Appl. No.: 283,806

[22] Filed: Dec. 13, 1988

[30] Foreign Application Priority Data

Oct. 21, 1988 [JP] Japan .................................. 63-266346

[51] Int. Cl.[4] ............................................. H01M 6/16
[52] U.S. Cl. ..................................... 429/197; 429/218
[58] Field of Search ..................... 429/218, 194, 197; 420/528, 549; 252/182.1

[56] References Cited

U.S. PATENT DOCUMENTS

| | | | |
|---|---|---|---|
| 3,929,504 | 12/1975 | Gore et al. | 429/194 |
| 4,002,492 | 1/1977 | Rao | 429/194 |
| 4,228,226 | 10/1980 | Christian et al. | 429/194 |
| 4,626,335 | 12/1986 | Cupp et al. | 429/218 X |
| 4,645,726 | 2/1987 | Hiratani et al. | 429/218 X |

*Primary Examiner*—Anthony Skapars
*Attorney, Agent, or Firm*—Wenderoth, Lind & Ponack

[57] ABSTRACT

A lithium secondary battery which comprises a positive electrode made of vanadium pentoxide as a principle component, a negative electrode made of lithium absorbing alloy, and an electrolyte prepared from an organic solvent dissolved with lithium salt. The lithium absorbing alloy is an alloy containing aluminum as a principle component, and the amount of lithium absorbed by the alloy is not greater than 8 wt % relative to the weight of the vanadium pentoxide and not smaller than 4 wt % relative to the alloy containing the aluminum as the principal component.

11 Claims, 2 Drawing Sheets

LITHIUM SECONDARY BATTERY

BACKGROUND OF THE INVENTION

1. Field of the Invention

The present invention generally relates to a rechargeable lithium secondary battery suited for use in a mobile DC power unit, a back-up power unit. More particularly, the present invention relates to an improvement in lithium secondary battery comprising a non-aqueous electrolyte containing lithium ions, a positive electrode made of vanadium pentoxide and a negative electrode made of a lithium-aluminum alloy capable of reversibly absorbing and discharging lithium when the battery is charged and discharged.

2. Description of the Prior Art

The secondary battery utilizing lithium as a negative electrode is recently being largely developed in a number of institutes because of its reliability and possession of high density energies. By way of example, the applicability of vanadium oxides, chromium oxides, manganese oxides, molybdenum oxides, chalcogen compounds such as titanium disulfide and molybdenum disulfide, and electroconductive polymers such as polyacetylene and polyaniline as material for a positive electrode of the lithium secondary battery has been examined.

On the other hand, where lithium itself is used as material for the negative electrode, repetition of charging and discharge of the lithium secondary battery results in the generation of dendrite which in turn results in considerable reduction in cycle time between the charging and discharge. Accordingly, attempts have hitherto been made of the use of an aluminum alloy capable of absorbing lithium or a fusible alloy such as lead, bismuth, cadmium, indium and zinc.

The use of vanadium pentoxide or equivalent oxide as material for the positive electrode as is the case with the present invention is disclosed in, for example, U.S. Pat. Nos. 3,929,504 and 4,228,226. The use of the lithium-aluminum alloy as material for the negative electrode is disclosed in, for example, U.S. Pat. No. 4,002,492.

However, the lithium secondary battery wherein a particular combination of the above listed materials for the positive and negative electrodes is employed has not yet been used in practice.

When the secondary battery comprising the positive electrode made of vanadium pentoxide, the negative electrode made of pure lithium and the electrolyte made of a nonaqueous solvent dissolved with lithium perchloric acid is discharged, the discharge starts at about 3.5 volts with the voltage progressively decreasing down to about 3.0 volts while exhibiting a characteristic curve having a moderate flatness. During the period in which the voltage of the battery decreases from about 3.5 volts down to about 3.0 volts, the voltage corresponding to about one electron equivalent (the electric capacity of one mole of monovalent lithium which reacts with $V_2O_5$) is discharged. Thereafter, the voltage quickly decreases and, when the voltage attains about 2.5 volts, a second-stage discharge starts. During this second-stage discharge taking place, the voltage drop takes place slowly until it attains about 2.0 volts with the electric capacity smaller than about one electron equivalent being further discharged.

Upon the decrease of the voltage subsequent to the second-stage discharge, the voltage further decreases accompanied by a third-stage reaction. During the third-stage reaction taking place, the voltage slowly decreases down to about 1.0 volt and then rapidly decreases down to zero volt. When the voltage of the battery is at a potential lower than about 1.0 volt, an organic solvent such as propylene carbonate is decomposed accompanied by generation of gases.

At about zero volt, crystals of vanadium pentoxide are pulverized to such an extent that the battery can no longer be rechargeable.

As discussed above, where vanadium pentoxide is used as material for the positive electrode, the continued discharge at a voltage lower than about 1.0 volt brings about the above discussed problem and, therefore, any countermeasures have hitherto been required to avoid the above discussed problem.

SUMMARY OF THE INVENTION

Accordingly, the present invention has been devised with a view to substantially eliminating the above discussed problems inherent in the lithium secondary battery in which the positive and negative electrodes make use of vanadium pentoxide and the lithium absorbing alloy, and has for its object to provide an improved and practically useful lithium secondary battery capable of withstanding excessive discharge up to zero volt.

According to the present invention, as a result of examination done to substantially eliminate the above discussed problems and also to improve the cycle time between the charging and discharge of the battery, it has been found that the use of an aluminum alloy capable of absorbing lithium as material for the negative electrode in such a quantity that the amount of lithium absorbed is 8 wt % or smaller relative to the total weight of the vanadium pentoxide used as material for the positive electrode and the amount of the lithium is 4 wt % relative to the total weight of the aluminum alloy is effective to provide the lithium secondary battery which accomplish the above discussed object.

The basic idea of the present invention lies in that, when $V_2O_5$ is discharged, the discharge is allowed up to the second-stage discharge reaction and, by elevating the potential of the negative electrode before the voltage attains 1 volt relative to the pure lithium, the battery voltage is allowed to become zero volt.

By so doing, even though the lithium secondary battery is excessively discharged, the potential of $V_2O_5$ relative to the pure lithium will not attain a value lower than 1 volt and, also, no electrolyte will be decomposed, nor is $V_2O_5$ destroyed.

Also, since $V_2O_5$ is said to have a reversibility in charging and discharge up until the second-stage reaction, the selection of the amount of the lithium to be filled in the battery to a value smaller than the amount thereof which will be discharged during the second-stage reaction is effective to increase the cycle time between charging and discharge even though the lithium is consumed upon repetition of charging and discharge.

In the practice of the present invention, an aluminum alloy is employed as material for the negative electrode. Since the potential of the negative electrode increases to a value about equal to the potential of the positive electrode, for example, about 3 volts, when the excessive discharge takes place at normal temperature, the material for the negative electrode may be dissolved or decomposed in the electrolyte at such a high potential. Therefore, in order to avoid any possible dissolution or decomposition of the material for the negative electrode at the elevated potential, the aluminum alloy is selected for the negative electrode. Also, when lithium is absorbed in the aluminum alloy, and when the battery is discharged, some of the lithium will remain in the alloy and does not participate in the discharge. Although the amonnt of the lithium remaining in the alloy varies depending on conditions, an excessive discharge over a long period of time will leave the lithium in an quantity of about 1 to 2 wt %, however, the quantity would amount to several percents if the battery is discharged down to 1 volt. In view of this, in order to render the negative electrode to exhibit a maximum available charging and discharge performance, the amount of lithium employed in the practice of the present invention is preferred to be 2wt %, preferably 4 wt %, or higher than the amount of the aluminum alloy.

During the excessive discharge, the potential of the negative electrode will increase to a value generally equal to the potential of the positive electrode. Once this occur, there may arise a problem associated with the corrosion of a metallic collector held in contact with the negative electrode and a negative electrode casing which may be induced by the high potential. Although no problem may arise so long as the battery is used at normal temperature, the excessive discharge of the battery at an elevated temperature of, for example, 60°, is very problematic so much as to result in considerable reduction in battery performance. Therefore, in the practice of the present invention, high corrosion resistant stainless steel containing chromium in a quantity of 16 wt % or more and molybdenum in a quantity within the range of 1 to 3 wt % is employed as material for both of the electric collector and the negative electrode casing so that the battery according to the present invention can withstand severe conditions.

BRIEF DESCRIPTION OF THE DRAWINGS

This and other objects and features of the present invention will become clear from the following description taken in conjunction with a preferred embodiment thereof with reference to the accompanying drawings, in which.

DETAILED DESCRIPTION OF THE EMBODIMENT

Figure 1:
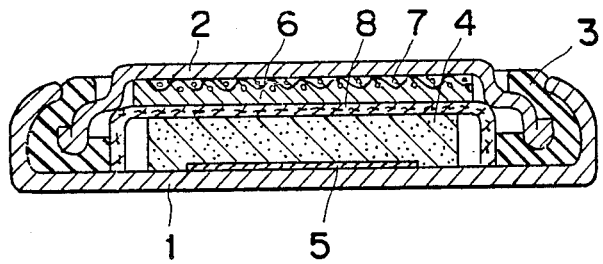
FIG. 1 is a side sectional view of a coin-type lithium secondary battery embodying the present invention.

Reaction of $V_2O_5$ is generally considered to be as follows.

$$V_2O_5 + xLi + xe \underset{\text{Discharge}}{\overset{\text{Charge}}{\rightleftharpoons}} Li_x V_2O_5$$

-continued

First-stage Reaction $x \approx 1$
Second-stage Reaction $x \leq 2$
(inclusive of First-stage Reaction)

The electric capacity during the first-stage reaction is 147 mAh/g, and that during the second-stage reaction is 147 mAh/g or lower (exclusive of that during the first-stage reaction) and, therefore, the total electric capacity is 298 mAh/g or lower.

On the other hand, the stoichiometric electric capacity per unit weight of lithium is about 3861.7 mAh/g and, therefore, the ratio by weight at the isoelectric capacity is as follows.

| | |
|---|---|
| Amount of $V_2O_5$ consumed during First-stage Reaction | $V_2O_5:Li = 100:3.8$ |
| Amount of $V_2O_5$ consumed up to Second-stage Reaction (as two electron reaction) | $V_2O_5:Li = 100:7.6$ |

In view of the foregoing, it can be theoretically said that the amount of the lithium relative to 100 parts by weight of $V_2O_5$ suffices to be 7.6 wt % or smaller relative thereto. However, some of the lithium will be consumed by a slight amount of water contained in the electrolyte, a water content in the material for the positive electrode and a carbon electroconductive agent and some of them will penetrate deep into the alloy for the negative electrode without participating in the reaction. Accordingly, the selection of the amount of the lithium in a quantity not higher than 8 wt % relative to $V_2O_5$ is suited.

An practically effectively utilized reaction is the first-stage reaction of $V_2O_5$ and, therefore, the effective amount of the lithium is equal to the amount thereof consumed during the first-stage reaction, that is, 3.8 wt %. If the amount of the lithium is considerably smaller than 3.8 wt %, the utility of $V_2O_5$ will be lowered accompanied by reduction in energy efficiency. Therefore, the amount of the lithium is preferred to be about 3.8 wt % relative to $V_2O_5$ and, experimentally, within the range of 3 to 6 wt % relative to $V_2O_5$.

With respect to the alloy for the negative electrode, an alloy of aluminum system or an alloy of lead can be used. However, in the practice of the present invention, the alloy used for the negative electrode must be of a type which will not be dissolved or decomposed even when the potential of the negative electrode increased to about 3 volts during the excessive discharge. This is because the dissolution of metallic ions often brings about various adverse effects in the battery in such a way as to decompose the electrolyte accompanied by an increase in internal resistance and, as a case may be, an electric shortcircuit may occur inside the battery.

A result of examination has revealed that aluminum or an aluminum alloy added with a slight amount of silver, manganese, indium and so on does not dissolve in contact with the electrolyte, but any one of lead, cadmium, bismuth and zinc dissolve in contact with the electrolyte.

In view of the foregoing, the use of the aluminum alloy as a principle material for the negative electrode is effective and preferred as it has been found that it can play an important role.

On the other hand, some of the lithium will remain in the alloy even when discharged after having been absorbed in the aluminum alloy. Therefore, in order to permit a sufficient charging and discharge characteristic to be exhibited, the amount of lithium absorbed is preferred to be 4 wt % or higher relative to the aluminum alloy.

Summarizing the above, by the use of the aluminum alloy as material for the negative electrode, with the amount of the lithium absorbed in the aluminum alloy selected to be 8 wt % or lower, preferably within the range of 3 to 6 wt %, relative to $V_2O_5$, and to be 4 wt % relative to the aluminum alloy, the lithium secondary battery capable of withstanding the excessive discharge according to the present invention can be obtained.

Also, as hereinbefore discussed, the potential of the negative electrode increases to a value about equal to the potential of the positive electrode during the excessive discharge and, therefore, a problem will arise as to the corrosion of the metallic collector and the negative electrode casing which may be induced by the high potential.

The high potential referred to above may, since the discharge of the positive electrode proceeds to the second-stage reaction, be about 3 volts and, therefore, the resistance to corrosion may not necessary be required so high as the corrosion resistance required by the positive electrode casing during the excessive charging. Generally, as material for the positive electrode casing, a high corrosion resistant stainless steel containing a slight amount of nickel, 20 to 30 wt % of chromium and about 2 wt % of molybdenum is used. The negative electrode casing may, so far as the excessive discharge at normal temperature is concerned, be made of a well-known 18Cr-8Ni stainless steel containing a relatively large amount of each of chromium and molybdenum, but containing no molybdenum. However, the excessive discharge at an elevated temperature of, for example, about 60° tends to accelerate corrosion of the negative electrode casing and the negative electric collector and, therefore, the use of a highly corrosion resistant material is desirable.

In view of the foregoing, a result of examination has indicated that the use of stainless steel containing 1 to 3 wt % of molybdenum and 16 wt % or more chromium, such as identified by SUS 444 and SUS 316 according to JIS (Japanese Industrial Standards) is suited as material for each of the negative electrode casing and the negative electrode collector. It has been found that the specific stainless steel does not corrode and exhibits a stabilized quality even at excessive discharge at zero volt and at an elevated temperature.

With respect to the electrolyte, a non-aqueous solvent dissolved with lithium salt such as, for example, $LiClO_4$, $LiBF_4$, $LiPF_6$, $LiAsF_6$ and $LiCF_3SO_4$ is generally used. However, because the vanadium pentoxide used in the practice of the present invention as material for the positive electrode is very high in potential, for example, about 3.5 volt, relative to the lithium and because during the charging a higher voltage is applied, the electrolyte capable of withstanding such higher voltage is required.

In view of the foregoing, as a result of examination, $LiBF_4$ has been found suitable because of its high voltage breakdown characteristic.

However, when the electrolyte prepared by dissolving $LiBF_4$ in a mixed solvent of propylene carbonate (PC) and 1.2-dimethoxyethane (DME) in a ratio of 1 mol per liter is employed, the electrolyte can exhibit a satisfactory stability even during the excessive charging at 2.5 volts at a high temperature of, for example, about 60°, the charging and discharge cycle tends to be considerably reduced. Therefore, continued studies have been conducted and, as a result thereof, it has been found that the use of a mixed solvent containing two or more components and in which γ-butyrolactone (BL) is employed as one of the components is effective to improve the charging and discharge cycle time.

More specifically, the mixed solvent is employed in the form of a mixture of esters such as, for example, propylene carbonate, ethylene carbonate (EC) or butylene carbonate (BC) with ethers such as, for example, DME, ethoxy methoxyethane (EME) or 1.2-diethoxyethane.

Although the use of BL itself may be effective to achieve the charging and discharge to some extent, the cycle time thereof tends to be reduced and, therefore, the intended effect can be first exhibited by the use of the above described mixed solvent Although the reason therefor has not yet been identified, it appears that BL has an affinity with $LiBF_4$ from the fact that BL is generally used in combination with $LiBF_4$. However, since the dielectric constant of BL is not so high, the addition of PC or EC having a relatively high dielectric constant appears to have improved the activity of $LiBF_4$ relative to the charging and discharge. Moreover, the addition of DME or EME brings about such effects to lower the viscosity of the electrolyte, to facilitate the penetration thereof into the positive electrode during the assembly of the battery and to improve a load characteristic of the battery.

Hereinafter, the present invention will be illustrated by way of non-limiting examples.

EXAMPLE 1

FIG. 1 of the accompanying drawings illustrates a sectional view of the lithium secondary battery embodying the present invention and in which vanadium pentoxide and lithium absorbed alloy are used as materials for the positive and negative electrodes, respectively. As shown therein, reference numeral 1 represents a positive electrode casing concurrently serving as a positive terminal and made of a high corrosion resistant stainless steel; reference numeral 2 represents a sealing lid concurrently serving as a negative terminal and formed of stainless steel, identified by SUS 304 in JIS, by the use of any known press work; and reference numeral 3 represents a polypropyrene gasket used to insulate the casing from the sealing lid. Reference numeral 4 represents a positive electrode which is prepared by mixing and kneading 85 parts by weight of vanadium pentoxide, 5 parts by weight of carbon black serving as an electroconductive agent, 10 parts by weight of a solid component of fluoroplastics dispersion, drying and milling the solid product into pellets of 14.0 mm in diameter each containing 250 mg of vanadium pentoxide. Reference numeral 5 represents a positive electrode collector in the form of a carbon coating deposited on the casing 1. Reference numeral 6 represents a lithium absorbed alloy in the form of an aluminum pellet 14.0 mm in diameter and weighing 125 mg. During the manufacture of the battery embodying the present invention, the alloy 6 is installed with no lithium absorbed thereby.

Reference numeral 7 represents a negative electrode collector employed in the form of a stainless steel net having 60 meshes and having a wire gauge of 0.1 mm in diameter. Reference numeral 8 represents a separator made of finely perforated film of polypropylene.

The electrolyte used was prepared by mixing propylene carbonate and 1,2-dimethoxyethane in a mixing ratio of 1:1 and by adding 1 mol per liter of $LiClO_4$ to the resultant mixture.

The composition of the negative electrode alloy was adjusted as shown in Table 1. The lithium was absorbed in the alloy, which is a carrier, by press-fitting a foil of a desired amount of lithium to the carrier alloy and electrically charging it in the electrolyte.

TABLE 1

| Amt. of Li (wt %) | | Negative Electrode | | | Pb |
| --- | --- | --- | --- | --- | --- |
| Re. to $V_2O_5$ | Re. to Negative Metal Carrier | Pure Al | Al (98%) Mn (2%) | Al (97%) Mn (2%) In (1%) | (50%) Cd (50%) |
| 0.5 | 1 | No. 1 | No. 10 | — | |
| 1 | 2 | No. 2 | No. 11 | — | |
| 2 | 4 | No. 3 | No. 12 | — | |
| 3 | 6 | No. 4 | No. 13 | — | |
| 4 | 8 | No. 5 | No. 14 | No. 19 | No. 20 |
| 6 | 12 | No. 6 | No. 15 | — | |
| 8 | 16 | No. 7 | No. 16 | — | |
| 11 | 22 | No. 8 | No. 17 | — | |
| 15 | 30 | No. 9 | No. 18 | — | |

With the use of these negative electrodes listed in Table 1 above, 20 lithium secondary batteries, identified by No.1 to No.20, each 20 mm in diameter and 2.0 mm in thickness, were prepared.

Each of these batteries was tested and the discharge sustaining time was measured until the voltage became 2.5 volts. Subsequently, each battery was allowed to discharge at room temperature for one month while connected to a resistance load of 3 kilo-ohms until the voltage attained zero volt, followed by the measurement of the change in internal resistance at an alternating current method of 1 KHz.

After the measurement, each battery was charged with a current of 1 mA to 3.5 volts and then alternately discharged and charged 20 times in such a way as to allowed each battery to discharge at 1 mA for 24 hours (zero volt cut) and to be charged at the same current for 24 hours (3.5 volt cut). Thereafter, the sustaining time during which each battery charged to 3.5 volts after 20 cycles of charging and discharge was allowed to discharge at 1 mA down to 2.5 volts was measured.

Figure 2:
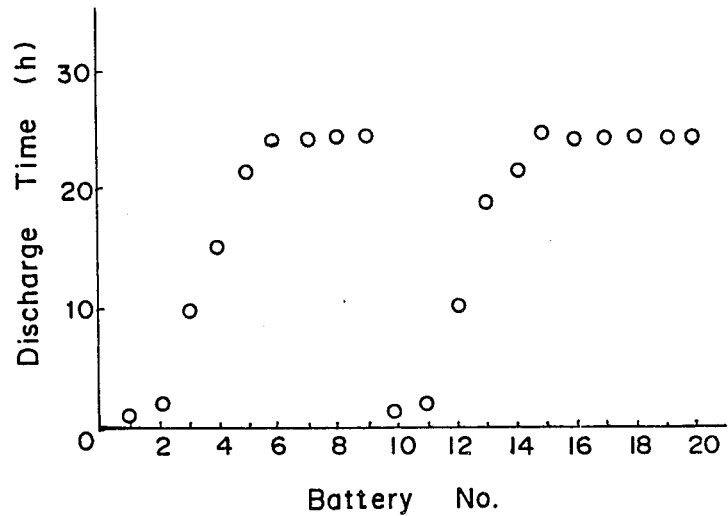
FIG. 2 is a comparison graph showing initial discharge sustaining times of various batteries at 1 mA.
Figure 3:
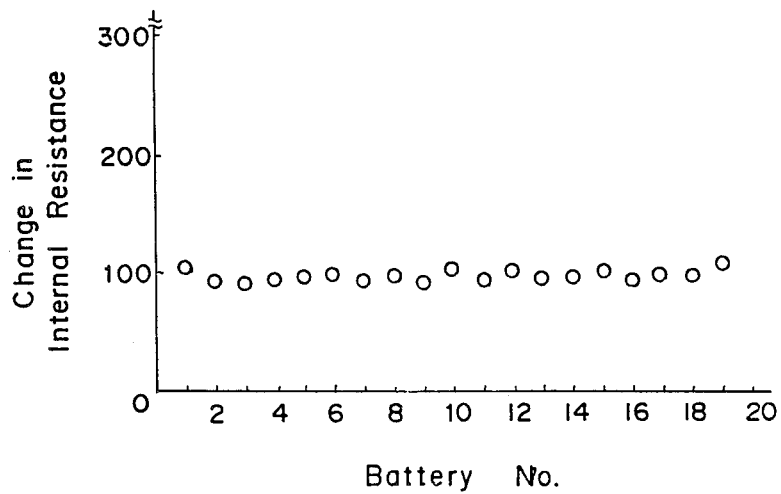
FIG. 3 is a comparison graph showing internal resistances exhibited by the various batteries after one month of excessive discharge.
Figure 4:
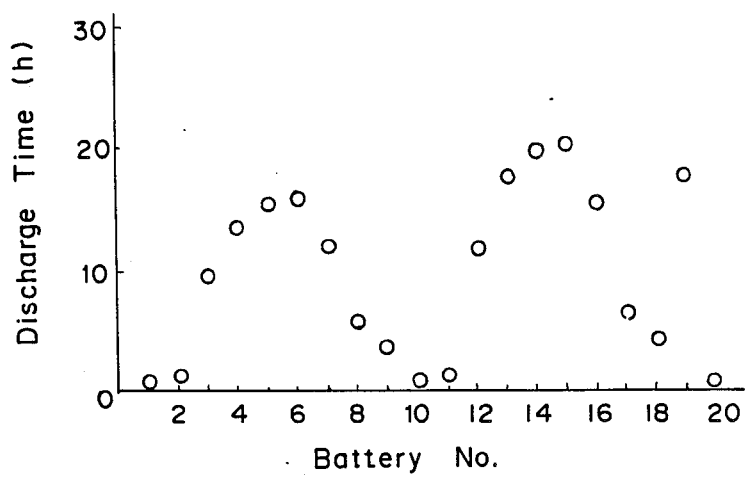
FIG. 4 is a comparison graph showing sustaining times of the various batteries at 1 mA after one month of excessive discharge and also after 20 cycles of charging and discharge.

Results of these tests are shown in FIGS. 2 to 4. As can be understood from FIG. 2 showing the initial discharge sustaining time, at the initial discharge, in order to obtain the electric capacity, the larger the amount of lithium, the better. In particular, of the batteries in which pure aluminum is used, the batteries No.3 to No.9 have exhibited the increased discharge sustaining time, the maximum sustaining time being substantially exhibited by the batteries No.6 to No.9. In these batteries, the electric capacity given when the effective active material of $V_2O_5$ used for the positive electrode function sufficiently appears to correspond to that for 24 to 25 hours. A similar description as above can be equally applicable to the batteries No.10 to No.18 in which the Al-Mn alloy is used, the battery No.19 in which Al-Mn-In alloy is used and the battery No.20 in which Pb-Cd alloy is used.

On the other hand, in the case of the batteries No.1 and No.2, the available electric capacity is very small. The reason therefor appears not only because the amount of lithium used is small, but also because lithium used tends to penetrate into aluminum leaving some lithium which does not come from the aluminum and does not participate in the reaction. The reason that the electric capacity is available in the batteries No.3 et seqq., appears because the concentration of addition of the lithium relative to the aluminum alloy is 4 % which is greater than the amount of the residue lithium. From the foregoing, in the practice of the present invention, the amount of lithium filled should be 4 wt % or higher relative to the aluminum alloy.

Referring to FIG. 3 showing the stability of each of the batteries No.1 to No.20 exhibited by the negative electrode alloy during the excessive discharge, it is clear that the batteries in which the aluminum alloy is employed for the negative electrode have exhibited a stabilized internal resistance, while the internal resistance exhibited by the battery No.20 is abnormally increased. This appears to be because, when the potential of the negative electrode increases to about 3 volts relative to the lithium, Pb and Cd are ionized to such an extent as to bring about adverse effects and as to cause the electrolyte to be decomposed. While the internal resistance exhibited by the battery No.19 in which the Al-Mn-In alloy is employed is stabilized, this appears to have resulted from the fact that, since the amount of In added is very small, the dissolution of the electrolyte is avoided.

From the foregoing, it can be concluded that, as far as the excessive discharge at normal temperature is concerned, the use of the aluminum alloy is superior to the use of the Pb alloy.

FIG. 4 illustrates the electric capacities exhibited by the batteries No.1 to No.20 after the deep charging and discharge have been repeated subsequent to the excessive discharge. It appears that the use of the lithium in a relatively large amount tends to result in deterioration. While each of the batteries No.7 and No.16 exhibits a discharge time of about 15 hours, any one of the batteries No.9, No.9, No.17 and No.18 in which a larger amount of lithium than that in the batteries No.7 and No.16 is employed exhibits a reduced discharge time. This appears to have resulted from the fact that the reaction of $V_2O_5$ has proceeded to the second-stage reaction et seqq. As regards the batteries No.1, No.2, No.10 and No.11, since the amount of lithium is relatively small, no electric capacity is available, and as regards the battery No.20, the deterioration takes place because of the use of the Pb-Cd alloy.

From the foregoing, it can be concluded that the use of the aluminum alloy for the negative electrode, the selection of the amount of lithium to be absorbed to be 8 wt % or lower, preferably within the range of 3 to 6 wt %, relative to $V_2O_5$, and the selection of the amount of lithium absorbed to be 4 wt % relative to the aluminum alloy are essential in the practice of the present invention.

Also, as can be understood from FIG. 4, comparison of the batteries No.4 to No.6, the batteries No.13 to 16 and the battery No.19 indicates that the use of the aluminum alloy is better than the use of pure aluminum as evidenced by the batteries No.13 to No.15 exhibiting an excellent charging and discharge cycle characteristic. Although not shown, a similar effect to that exhibited by the batteries in which the aluminum alloy is used have been exhibited by the battery in which silver is used.

While the foregoing description is generally centered on the performance of the lithium secondary battery in connection with the excessive discharge, it is clear that the lithium secondary battery according to the present invention is excellent in respect of the discharge sustaining time, the change in internal resistance and the discharge sustaining time after 20 cycles of discharge and charging, provided that the amount of lithium used is restricted within the prescribed range.

The excessive discharge characteristic of the lithium secondary battery of the present invention at the elevated temperature has been examined, specific examples of which will now be described.

EXAMPLE 2

Lithium secondary batteries identified respectively by A, B, C and D were prepared each of which employed the same lithium absorbed alloy as in the battery No.15 in Table 1. However, material for each of the sealing lid 2 and the negative electrode collector 7 is chosen as tabulated in Table 2 below.

TABLE 2

| Battery | Composition (wt %) | | | | | | | | |
|---|---|---|---|---|---|---|---|---|---|
| | Cr | Mo | C | Si | Mn | P | S | Ni | Fe |
| A | 17.5 to 19.5 | 1.75 to 1.25 | <0.02 | <1.0 | <1.0 | <0.04 | <0.03 | <0.6 | Balance |
| B | 16.0 to 18.0 | 2.0 to 3.0 | <0.08 | <1.0 | <2.0 | <0.045 | <0.03 | 10.0 to 14.0 | Balance |
| C | 18.0 to 20.0 | — | <0.08 | <1.0 | <2.0 | <0.045 | <0.03 | 8.0 to 10.5 | Balance |
| D | 16.0 to 18.0 | — | <0.12 | <0.75 | <1.0 | <0.04 | <0.03 | <0.6 | Balance |

Note: The compositions of stainless steel used in the batteries A, B, C and B are stainless steel identified by SUS 444, SUS 316, SUS 304 and SUS 430, respectively, according to JIS.

Each characteristic of each of these batteries A, B, C and D was measured at room temperature after the manufacture and also after 10 kilo-ohm constant resistance discharge has been carried out for 2 months at 60° C., the result of which is shown in Table 3 below.

TABLE 3

| | CONDITIONS | | | | | | | |
|---|---|---|---|---|---|---|---|---|
| | After Mfg. | | | | After Discharge at Elevated Temperature | | | |
| Batteries | A | B | C | D | A | B | C | D |
| Closed Circuit Volt. | 3.28 volts | 3.29 volts | 3.22 volts | 3.20 volts | −0.025 volt | −0.029 volt | −0.028 volt | −0.030 volt |
| Internal Resistance | 5.6 ohms | 6.0 ohms | 6.1 ohms | 5.9 ohms | 5.5 ohms | 6.8 ohms | 112.5 ohms | 75.5 ohms |
| Discharge Capacity | 20.5 mAh | 21.0 mAh | 21.1 mAh | 20.9 mAh | 21.5 mAh | 20.1 mAh | 6.8 mAh | 8.5 mAh |

Note: The discharge capacity referred to in Table 3 above is the one measured after each battery has been charged at 3.5 volts and is subsequently discharged through 10 kilo-ohm constant resistance discharge down to 2 volts. Each value in Table 3 is an average value obtained from 20 samples.

As can be understood from Table 3, each of the batteries A and B in which each of the sealing lid and the negative electrode collector is made of stainless steel containing chromium as its principal component and molybdenum has exhibited the electric capacity substantially equal to that exhibited thereby before the charging, even after the battery has been discharged for a long time at the elevated temperature.

Also, results of examination of the batteries which are disassembled after the excessive discharge at the elevated temperature have indicated that the inner surface of the negative electrode collector of each of the batteries C and D was corroded, but no corrosion was found in each of the batteries A and B.

Moreover, when comparison is made between the batteries A and D, the respective compositions of which are substantially identical with each other except for the content of molybdenum, the addition of molybdenum brought about a considerable effect in the battery A.

Figure 5:
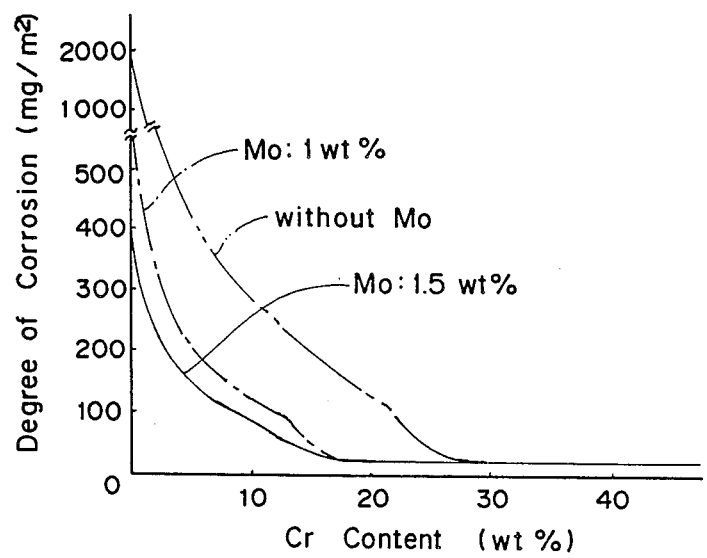
FIG. 5 is a graph showing the degree of corrosion of stainless steels containing molybdenum and chromium in different mixing ratios.

FIG. 5 illustrates change in degree of corrosion exhibited by the stainless steels containing 0, 1 and 1.5 wt % of molybdenum, respectively, relative to the change in chromium content in those steels, which steels were immersed in the previously discussed electrolyte and allowed to stand for one month at 70° while 2.5 volts was applied to the lithium. It has been found that, when the molybdenum content exceeds 3 wt %, the steel tends to become very fragile making it very difficult for the steel to be rollmilled. Therefore, the molybdenum content in the practice of the present invention is preferred to be within the range of 1 to 3 wt %.

It is to be noted that the steels used during the experiments for the purpose of the present invention are the ones commercially available in the market and experimentally prepared and, therefore, the content of one or more impurities such as manganese, carbon, nickel, silicon and others, other than the chromium and molybdenum contents, is not uniform all over those steels.

Thus, it is clear that the use of stainless steel containing molybdenum within the range of 1 to 3 wt % and chromium within the range of 16 to 20 wt % as material for the negative electrode collector is effective to provide the battery capable of exhibiting excellent characteristics at the elevated temperature when excessively discharged.

EXAMPLE 3

With the lithium concentration and the alloy material for the negative electrode of No.15 in Example 1 taken as reference, and using LiB$_4$ in a quantity of 1 mol per liter, such non-aqueous solvents as tabulated in Table 4 were prepared.

TABLE 4

|  |  | PC | BC |
|---|---|---|---|
| BL used | DME used | E1 | E2 |
|  | DME not used | E3 | E4 |
| BL not used | DME used | E5 | E6 |

[Note]
PC: Propylene carbonate
BC: Butylene carbonate
BL: γ-butyrolactone
DME: 1,2-dimethoxyethane These batteries were tested and compared in the following manner. Each of the batteries E1 to E6 was applied with 3.5 volt voltage at 60° C. and, after three months later, both of the change in internal resistance (according to the alternating current method at 1 KHz) and the sustaining time until the respective battery discharged at 1 mA attains 2.5 volts were measured and compared with the respective initial value, the result of which is shown in Table 5.

TABLE 5

| Electrolyte | E1 | E2 | E3 | E4 | E5 | E6 | Battery No. 15 |
|---|---|---|---|---|---|---|---|
| Internal Resistance | 120 | 125 | 110 | 115 | 120 | 125 | 2500 |
| Sustaining Time | 95 | 98 | 97 | 96 | 96 | 98 | 15 |
| Charging & Discharge Cycle Time | 80 | 70 | 90 | 85 | 40 | 45 | — |

Subsequently, the charging and discharge are repeatedly carried out under the following conditions, followed by the measurement of the number of cycles of charging and discharge which took until the time require for each battery to discharge down to 2.5 volts to attain 50% of the initial time which the respective battery had taken, the battery then being compared with the battery which has not excessively charged. The results of the test are tabulated in Table 5 above.

Charging: 3.4 volt, 300 ohms, 24 hours
Discharge: 3 kilo-ohms × 12 hours

From Table 5, it is clear that, after the excessive charging at elevated temperature, the batteries E1 to E6 in which LiBF$_4$ is used have exhibited both of the internal resistance and the subsequent discharge characteristic which are substantially similar to the respective initial values and which are substantially stabilized. On the contrary, the battery No.15 in which LiClO$_4$ is used has exhibited the considerably increased internal resistance, and the subsequent discharge sustaining time has considerably reduced. In view of the foregoing, the use of LiBF$_4$ is more effective in stability relative to the resistance to the excessive charging than the use of LiClO$_4$. However, the continued charging and discharge has shown that the cycle time varies depending on the solvent used, and the batteries E1 to E4 in which BL is used is excellent in that the rate of reduction from the initial value is small.

Also, where BL itself is used, the charging and discharge cycle time was about 60% of the initial value exhibited by the battery E1.

Accordingly, the use of the non-aqueous electrolyte dissolved with LiBF4 and containing two or more components including BL is effective to provide the battery which can withstand the excessive charging at elevated temperature and can exhibit an improved charging and discharge cycle time.

What is claimed is:

1. A lithium secondary battery which comprises:
   a positive electrode made of vanadium pentoxide as a principle component;
   a negative electrode made of lithium absorbing alloy;
   an electrolyte prepared from an organic solvent dissolved with lithium salt; and
   said lithium absorbing alloy being an alloy containing aluminum as a principle component, the amount of lithium absorbed by the alloy being not greater than 8 wt % relative to the weight of the vanadium pentoxide and not smaller than 4 wt relative to the alloy containing the aluminum as the principal component.

2. The battery as claimed in claim 1, wherein the amount of the lithium is within the range of 3 to 6 wt %.

3. The battery as claimed in claim 1, wherein the alloy containing the aluminum contains manganese in a quantity of about 2%.

4. The battery as claimed in claim 1, wherein the alloy containing the aluminum contains silver or indium in a quantity not greater than 1 wt %.

5. A lithium secondary battery which comprises:
   a positive electrode made of vanadium pentoxide as a principle component;
   a negative electrode made of lithium absorbing alloy, said lithium absorbing alloy being an alloy containing aluminum as a principal component;
   an electrolyte made of organic solvent dissolved with lithium salt;
   a corrosion-resistant battery casing including a sealing lid and a container for accommodating therein the positive and negative electrodes and the electrolyte;
   the amount of lithium in the lithium absorbing alloy being not greater than 8 wt % relative to the weight of the vanadium pentoxide and not smaller than 4 wt % relative to the aluminum containing alloy when the battery is charged, said sealing lid being made of steel which contains chromium in a quantity of not smaller than 16 wt % and molybdenum in a quantity within the range of 1 to 3 wt %.

6. The battery as claimed in claim 5, further comprising a negative electrode collector welded to the sealing lid, said collector being made of steel which contains chromium in a quantity of not smaller than 16 wt % and molybdenum in a quantity within the range of 1 to 3 wt %.

7. A lithium secondary battery which comprises:
   a positive electrode made of vanadium pentoxide as a principle component;
   a negative electrode made of lithium absorbing alloy, said lithium absorbing alloy being an alloy containing aluminum as a principal component;
   an electrolyte made of organic solvent dissolved with lithium salt, said electrolyte being prepared by dissolving LiBF$_4$ with the use of a mixed solvent containing at least γ-butyrolactone; and
   the amount of lithium in the lithium absorbing alloy being not greater than 8 wt % relative to the weight of the vanadium pentoxide and not smaller than 4 wt % relative to the aluminum containing alloy when the battery is charged.

8. The battery as claimed in claim 7, wherein the mixed solvent is a mixture of equal amounts of γ-butyrolactone, 1,2-dimethoxyethane and butylene carbonate.

9. The battery as claimed in claim 7, wherein the mixed solvent is a mixture of equal amounts of γ-butyrolactane, 1,2-dimethoxyethane and propylene carbonate.

10. The battery as claimed in claim 7, wherein the mixed solvent is a mixture of equal amounts of propylene carbonate and γ-butyrolactone.

11. The battery as claimed in claim 7, wherein the mixed solvent is a mixture of equal amounts of butylene carbonate and γ-butyrolactone.

* * * * *